Figure 1:
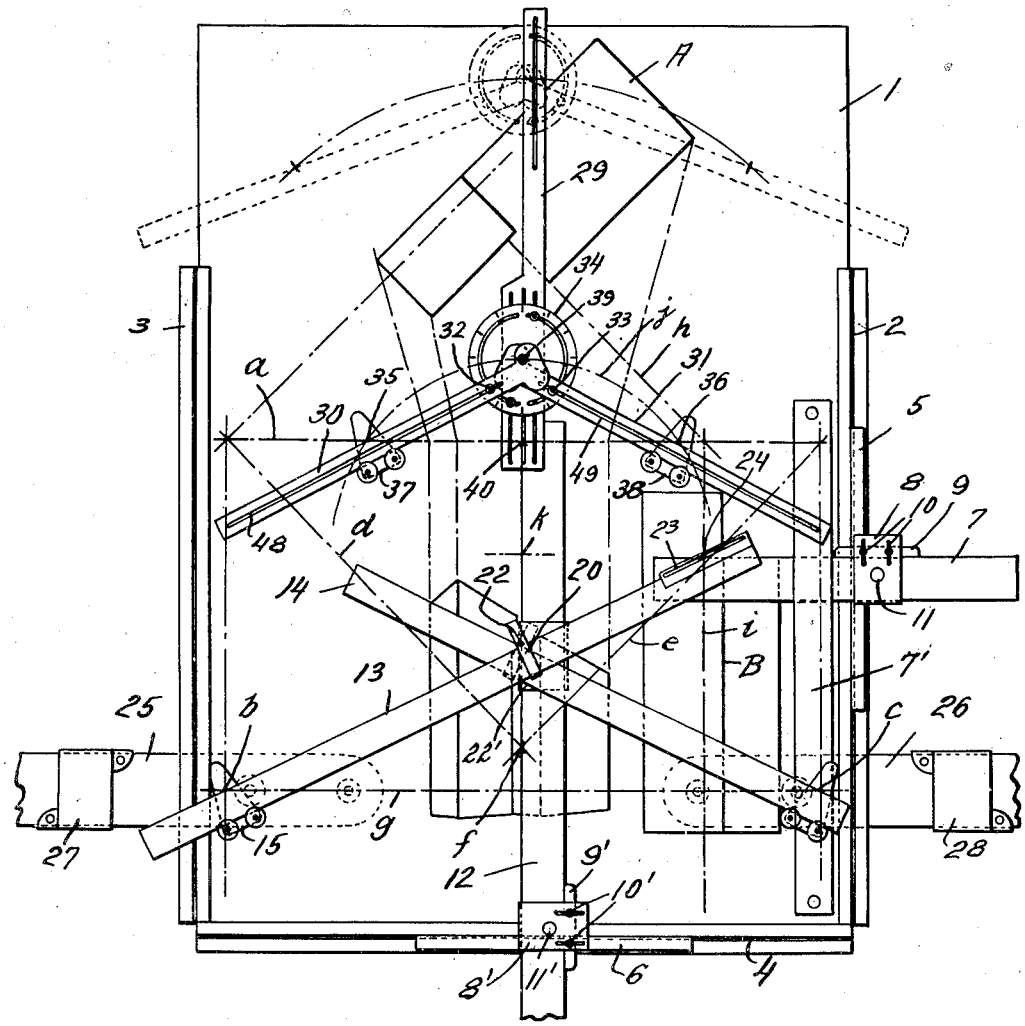

Jan. 24, 1928.

T. A. DE POSTELS 1,657,301

DRAFTING APPLIANCE

Filed July 31 1926

4 Sheets-Sheet 1

INVENTOR
Theodore A. de Postels
BY
ATTORNEYS

Jan. 24, 1928.

T. A. DE POSTELS 1,657,301

DRAFTING APPLIANCE

Filed July 31 1926

4 Sheets-Sheet 2

INVENTOR
Theodore A. de Postels
BY
ATTORNEYS

Jan. 24, 1928.

T. A. DE POSTELS 1,657,301

DRAFTING APPLIANCE

Filed July 31 1926

4 Sheets-Sheet 3

INVENTOR
Theodore A. de Postels
BY
Pennie Davis Marvin & Edmonds
ATTORNEYS

Jan. 24, 1928.  
T. A. DE POSTELS  
1,657,301  
DRAFTING APPLIANCE  
Filed July 31 1926  
4 Sheets-Sheet 4
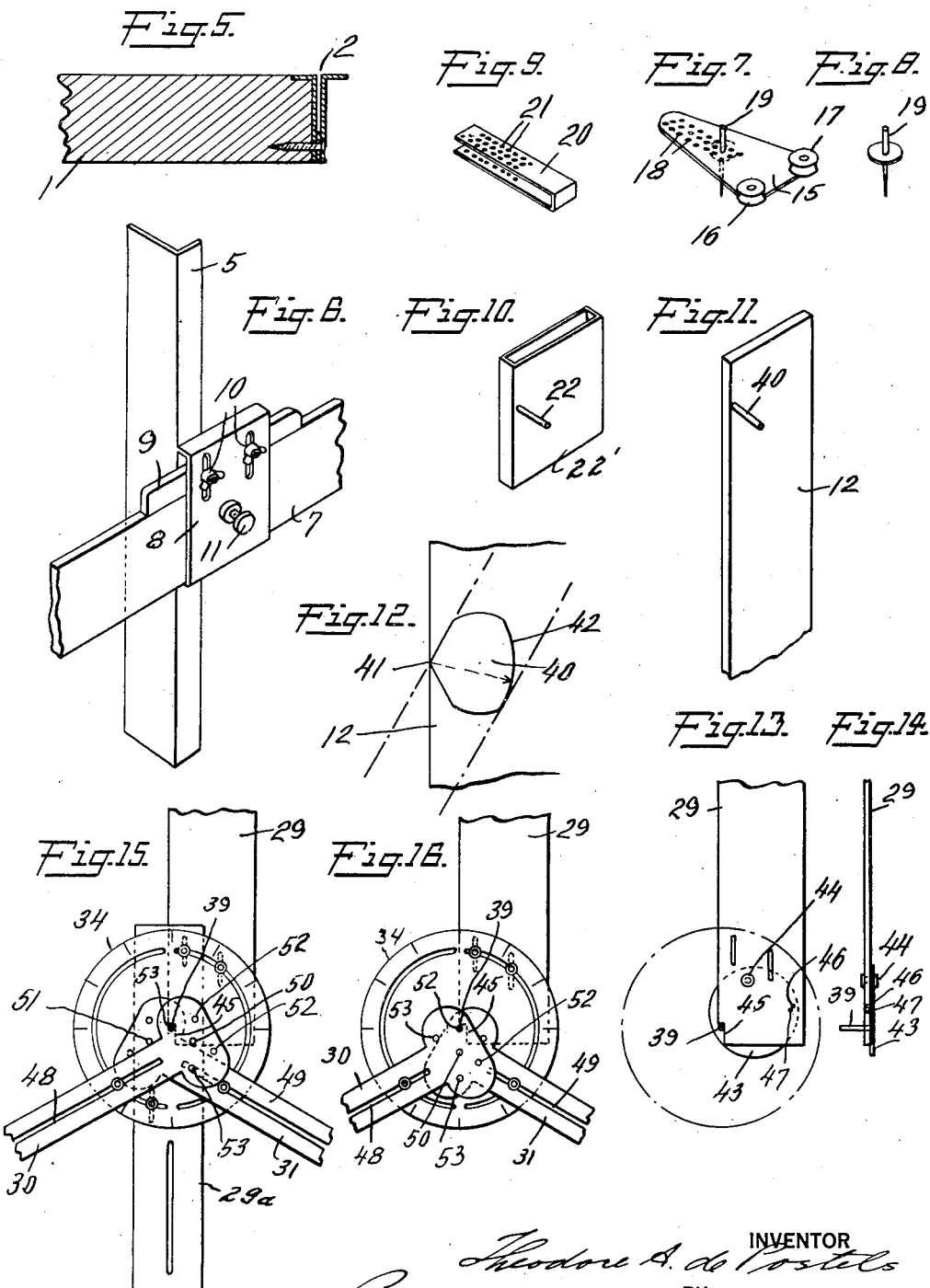

Patented Jan. 24, 1928.

1,657,301

UNITED STATES PATENT OFFICE.

THEODORE A. DE POSTELS, OF NEW YORK, N. Y.

DRAFTING APPLIANCE.

Application filed July 31, 1926. Serial No. 126,270.

This invention relates to drafting appliances, and particularly to appliances for use in making perspective drawings. The principal object of the invention is to provide simple and efficient devices whereby the draftsman can, with the use of a plan and an elevation of a structure, make a perspective view, accurately determining the position of all points and lines of the perspective drawing by a simple movement of one hand.

It has been proposed heretofore to provide drafting appliances to be used in making perspective drawings. Such appliances have been open to the objection that they are difficult to construct and to operate and they so obscure the field of operation as to make it difficult to draw in the necessary lines. One of the objects of my invention is to provide perspective drafting appliances consisting of simple, inexpensive parts so constructed and arranged that they do not interfere with the field of operation and so that they can be removed from the drafting board with a minimum of effort, thus leaving the board free for other operations. One of the principal features of the invention is the construction and arrangement of the several parts whereby all parts can be caused to move to any desired positions by simply applying a force by one hand to one part of the apparatus, thus leaving the other hand free to draw the necessary lines of the perspective view.

In general my invention includes improved rulers for use in drawing the lines which, if extended, pass through the vanishing points, another ruler cooperating with the rulers just mentioned and adapted to indicate the true heights of the object and make possible the accurate determination of the perspective heights, and my invention includes directing and indicating devices for use in determining the positions of the points and of the vertical lines of the perspective drawing. The invention also includes a number of improved details of construction which make it possible to move the various parts of the apparatus with a minimun of effort to secure a high degree of accuracy in making the perspective drawing and to remove the apparatus, or any parts thereof, from the drawing board with the greatest ease.

Figure 3:
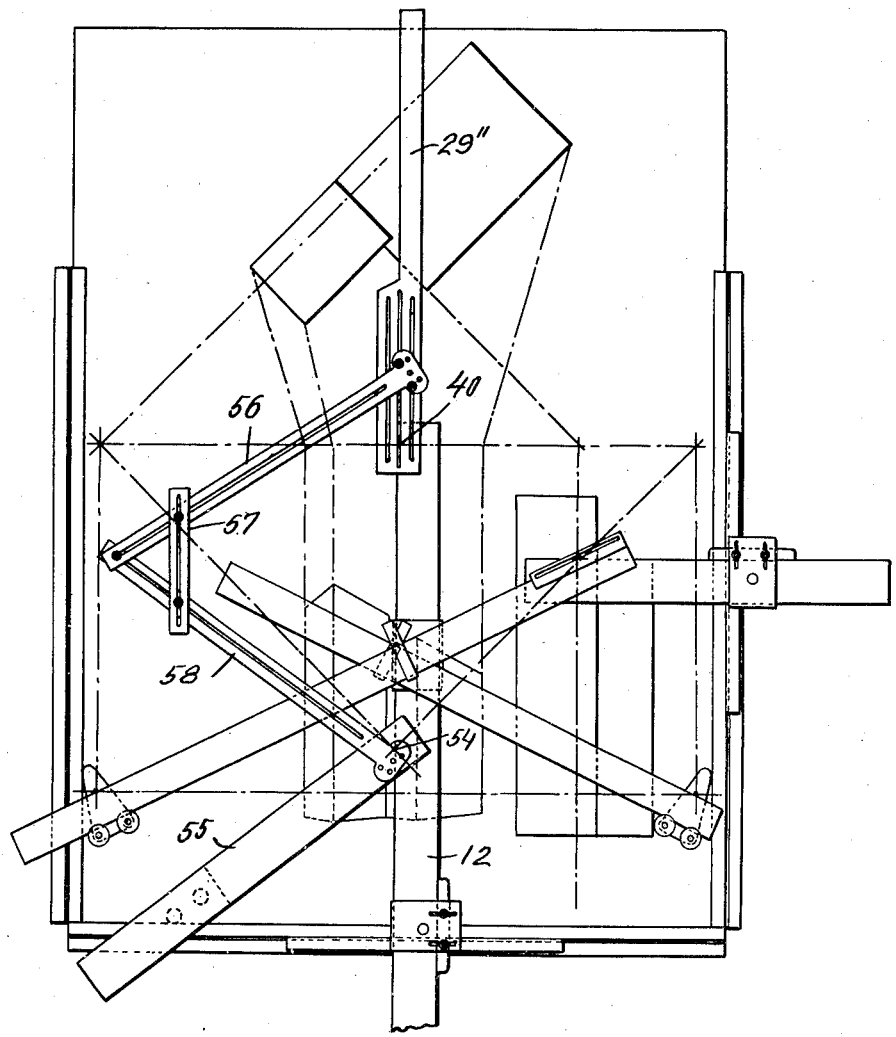
Figure 4:
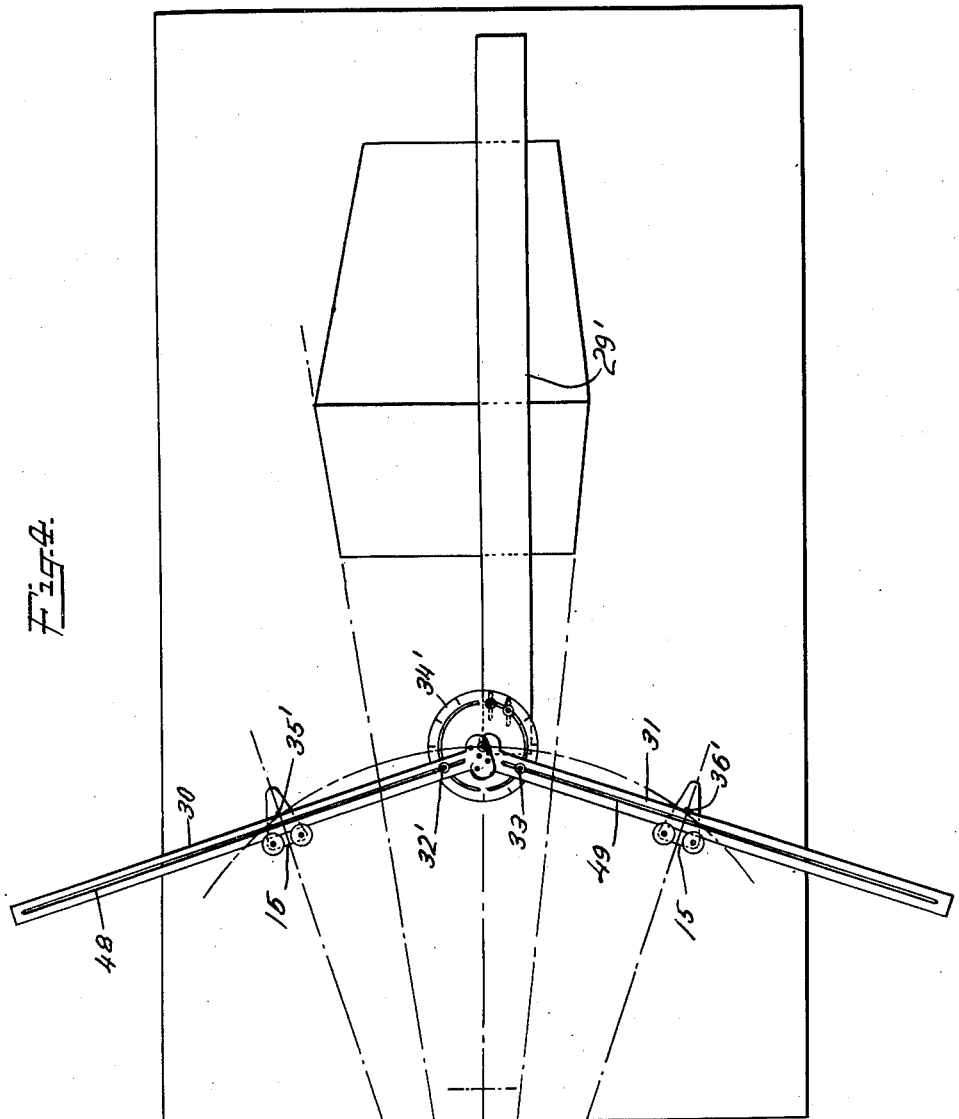

The various objects and advantages of my invention can be best understood by considering the following detailed description, which is to be taken in conjunction with the accompanying drawings, in which I have illustrated several embodiments of the invention. In the accompanying drawings, Fig. 1 is a plan view of one embodiment of the invention, Fig. 2 is an elevation of the apparatus shown in Fig. 1, Fig. 3 is a plan view of another embodiment of the invention, Fig. 4 is a plan view of one portion of the apparatus illustrating a particular use of the same, Fig. 5 is a fragmentary sectional view of a portion of a drawing board, illustrating a track or guide construction, Fig. 6 is a perspective view of a portion of one of the rulers, showing details of construction, Figs. 7 to 11, inclusive, are perspective views of various parts of the apparatus, showing details of construction, Fig. 12 is an enlarged plan view of one of the pivot pins, showing the construction of the same, Fig. 13 is a diagrammatic plan view of a portion of the director apparatus, Fig. 14 is a side elevation of the parts shown in Fig. 13, and Figs. 15 and 16 are plan views of portions of the director mechanism illustrating details of construction and different adjustments of the mechanism.

Figure 2:
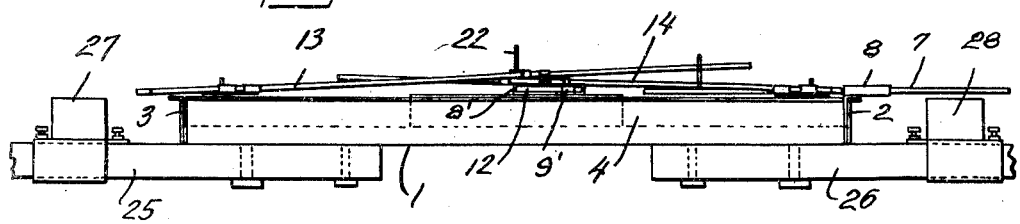

Referring to Figs. 1 and 2, I have illustrated at 1 a drawing board which may be of any suitable dimensions and constructed in the usual way, except for the provision of special guides or tracks 2, 3, and 4, extending along portions of the side edges of the board and along the bottom edge. These track members can be made out of metal or other suitable material and permanently secured to the board in any suitable way. Each track is provided with a longitudinal groove adapted to receive the downwardly projecting flange of a slide member, such as one of those illustrated at 5 and 6. One form of track member suitable for the purpose is illustrated in detail in Fig. 5. This track member comprises two strips of fairly rigid material such as metal separated by spacers arranged at intervals along the edge of the board. Nails or other suitable fastening devices passing through the two strips and the spacers serve to fix these parts to the edge of the board. This construction has the advantage of providing a suitable guide for the slide member without so encumbering the edge of the board as to interfere with the use of ordinary T-squares and other drafting appliances on the board. Furthermore, dust cannot collect in the grooves so as to interfere with the movement of the slide member; all dust particles fall through between the spacers. The slide member 5 is adjustably secured to a ruler 7 which can be used as a T square in the ordinary manner, and also to cooperate with other devices, as explained below. A sleeve member 8 is fastened to the slide member 5 and is adapted to receive the ruler 7. This sleeve is of such dimensions that it can accommodate rulers of different widths and thickness, and as illustrated in detail in Fig. 6, the lateral movement of the ruler within the sleeve can be restricted by fixing a small guide piece 9 in any adjusted position by means of the wing nuts 10 cooperating with studs or bolts. The ruler can be clamped in position by means of a small set screw 11.

A second ruler 12, which may for the purposes of this description be termed an indicator, is arranged to cooperate with the slide member 6 which can be moved along the bottom edge of the board. This ruler 12 can be adjustably secured to the slide member in a manner similar to that just described in connection with the ruler 7. Accordingly, I have illustrated a sleeve member 8' adapted to receive the ruler 12, a guide piece 9', and adjusting screws 10' and 11', similar to the corresponding parts associated with the ruler 7.

In making a perspective drawing with the use of the improved appliance, I follow the usual procedure according to which a plan view of the object, such as that represented at A, is arranged near the upper margin of the drawing board, and an elevation, such as that illustrated at B, is arranged near one side edge of the board. A line $a$ representing the picture plane is arbitrarily chosen and the vanishing points $b$, $c$ are determined in the usual way by drawing lines $d$ and $e$ from an observation point $f$ parallel with the adjacent side edges of the plan view A until these lines intersect the picture plane, and then dropping perpendiculars from these intersections to line $g$ arbitrarily chosen to represent the line of elevation of the observer's eye. The perspective height of any vertical edge of the object is ordinarily determined by drawing a line, such as that indicated at $h$, coinciding with an adjacent side of the object and intersecting the picture plane line $a$, then drawing a vertical line, such as $i$, intersecting a horizontal line (not shown) passing through top of the vertical edge in question on the elevation of the object B. From the intersection of the two last mentioned lines a line is drawn to the vanishing point $b$. The desired perspective height is indicated by the intersection of this line with a vertical line drawn to represent the edge in question. The position of this vertical line is determined by drawing a line from the given edge in the plan view toward the observation point until it intersects the line $a$. The vertical line passing through this intersection is the desired line representing the edge in question.

By using my improved appliance, it is possible to avoid drawing many of the lines above mentioned which must be drawn in order to make a perspective without the aid of any such appliance. The ruler 7 cooperates with the elevation of the object so as to make it unnecessary to draw any horizontal lines through this elevation figure, and I have provided rulers 13 and 14 which pivot about the vanishing points $b$ and $c$ and cooperate with the elevation ruler 7 so as to make it unnecessary to draw any lines toward the vanishing points; it is possible to at once draw in the lines representing horizontal edges of the object.

The ruler 13 can be arranged in any suitable manner to pivot about the vanishing point $b$. For example, a pin can be inserted in the board at this point, and the ruler can be caused to pivot about this pin. It is desirable to have the ruler free to slide back and forth, and I have provided a device for always keeping the ruler in contact with the pin. As illustrated in detail in Fig. 7, this device 15 may consist of a small piece of celluloid or other suitable material carrying a pair of guide rollers 16 and 17 and having a plurality of holes 18 therein, any one of which is adapted to receive the projecting pin fixed in the board at the vanishing point. The pin is shown at 19. The ruler 14 can be caused to pivot about a similar pin fixed in the board at the vanishing point $c$ and the rulers 13 and 14 can be interconnected by small yoke members 20, which may consist of celluloid or other suitable material. One of these members is shown in detail in Fig. 9 and as here represented is provided with a plurality of perforations or holes 21, adapted to receive a pin 22 carried by a slide 22' shown detached in Fig. 10 on the indicator ruler 12. The free end of the ruler 13 carries a slotted member 23 cooperating with a pin 24 carried by the ruler 7 near one edge thereof. Thus, if the indicator ruler 12 is moved to one side or the other, this causes the rulers 13 and 14 to move in a corresponding manner and movement may likewise be imparted to the elevation ruler 7. The rulers 13 and 14 can each be used independently of the other parts of the apparatus in which case horizontal lines can be drawn through the elevation figure B in the usual way. Where the ruler 7 is also used, it is not necessary to draw these horizontal lines, but to merely move the apparatus until the ruler 7 coincides with the horizontal line which would otherwise have to be drawn. This accurately determines the position of the ruler 13. The ruler 7 can be associated with either side of the drawing board and cooperate with either one of the rulers 13 and 14. A bridge member 7' can be used for the purpose of supporting the vanishing point pin above the drawing board so as to permit free movement of the ruler 7.

In the event that the vanishing points $b$ and $c$ fall outside the drafting board, I may provide extension members such as those illustrated at 25 and 26, carrying adjustable supports 27 and 28 in which pins can be fixed at the vanishing points. The supports 27 and 28 may each comprise a block carried by a slider movable along an extension member, such as those shown at 25 and 26. Set screws or other suitable devices can be used for fixing the blocks in any adjusted position on the extension members.

The rulers 13, 14 and 7 can be entirely removed from the drafting board by simply lifting them away from the board. There are no members with curved surfaces rigidly associated with the board, as is the case with most drafting appliances of this type, and anyone of the rulers can be quickly removed from the board by simply lifting it away from the board, and as easily replaced.

The indicator ruler 12 can be used for the purpose of drawing in lines representing the vertical edges of the object. The position of these lines can be determined as pointed out above, by first drawing lines from the edges in question on the plan view toward the observation point until they intersect the line $a$ representing the picture plane. I prefer, however, to provide apparatus which makes it unnecessary to actually draw any of these lines and to have this apparatus so associated with the indicator ruler that it can be moved by means of the latter, thus making it unnecessary to separately adjust the parts. This director mechanism can be moved to any desired position by simply moving the indicator ruler, and when the director mechanism occupies the desired position, the indicator ruler is automatically in the correct position for drawing the desired vertical line in the perspective figure.

The director mechanism illustrated in Fig. 1 comprises three relatively adjustable members 29, 30, and 31. The members 30 and 31 are pivoted to the member 29 about a common pivot 39 and set screws 32 and 33, cooperating with a slotted, graduated disc 34, serve as means for fixing the members 30 and 31 in any adjusted angular position with respect to the member 29. When these members are so fixed with respect to each other, all three members can be moved as a unit and the character of this movement is determined by pins 35 and 36 fixed to the drawing board. The members 30 and 31 are caused to pivot about these pins, the members having sliding contact with the pins and being held in contact with the same by suitable means, such as the roller guide members 37 and 38. These roller guide members may be similar in construction to those employed in connection with the rulers 13 and 14 above described. The positions of the pivot pins 35 and 36 can be determined by laying the director mechanism on the board in such a position that it will not interfere with that portion of the board on which the perspective drawing is to be made and with the center pin 39 in the same vertical line with the observation point $f$, dividing the distance between the pin 39 and the point $f$ into equal parts and drawing an arc represented by the line $j$ using the dividing point $k$ as the center of curvature. If the pins 35 and 36 are then placed in any two positions on this arc at equal distances from the center line passing through the observation point, then the director mechanism will execute the proper movements. The director mechanism can be moved to any position on a path determined by the pivot points 35 and 36, and the longitudinal axis of the director member 29, passing through the center point 39, will always be directed towards the observation point $f$, provided the members 30 and 31 make equal angles with the director member 29. A pin 40 carried by the indicator member 12 and cooperating with a slot in the director member 29 makes it possible to impart movement to the director mechanism by simply moving the indicator mechanism along the track or guide 4, as explained above. Thus whenever it is desired to draw in a perspective vertical line representing any certain vertical edge of the object, it is merely necessary to move the indicator member 12 until the edge of the director member 29 coincides with this edge in the plan view A. The indicator member 12 is then in a proper position to draw the vertical line in perspective view directly and it is not necessary to draw any lines from the plan view toward the vanishing point.

As stated above, the director mechanism can be located in any arbitrarily chosen position on the board. I have shown it in one position in full lines in Fig. 1, and I have shown it in a second position in dotted lines near the upper edge of the board. Regardless of the particular location of the director mechanism, it can be mounted on the drawing board in such a manner that the director member 29 always has an edge radial to the observation point.

I prefer to construct the pin 40 which interconnects the indicator member 12 with the director member 29, in the manner illustrated in Fig. 12. This pin is provided with an angular portion 41 adapted to engage one edge of a slot formed in the director member 29, this edge being in alignment with the working straight edge of the director member. The pin is provided with a curved surface 42, the center of curvature coinciding with the angular portion 41 of the pin, and the radius of curvature being substantially equal to the width of the slot which receives the pin. I prefer to construct the pin 40 in this manner so that it may provide a pivot point stationary with respect to the indicator member 12. If the pin were round or of other configuration not presenting an angular portion, then the true pivot point would shift around the circumference of the pin whenever the angular relation of the director and indicator members was changed. The curved surface of the pin 40 serves to hold the director member 29 in firm contact with the angular portion of the pin at all times.

In Figs. 13 to 16 inclusive, I have illustrated certain adjustable features of my invention. As illustrated in these figures, I prefer to mount the pin 39, which is associated with the director member 29, on a separate disc 43 pivoted to the director member 29 by any suitable means, such as the pin 44. The director member is provided with a notched portion 45, adapted to receive the pin 39 and it will be understood that by swinging the disc 43 about its pivot pin 44, the pin 39 can be swung into or out of the notch 45. The member 29 and the disc 43 can be provided with a number of holes or perforations, such as those indicated at 46 and 47, and these parts can be locked together by inserting a pin in these perforations. The disc can be locked in the position shown in Fig. 13 so that the center of the pin 39 will lie inside the margin or edge of the director member 29. The disc may also be locked in such a position that the center of the pin 39 is directly in line with this edge of the director member 29, as illustrated in Fig. 16.

The members 30 and 31 of the director mechanism are preferably constructed with their adjacent ends provided with a plurality of holes or perforations, each adapted to receive the pin 39. These members 30 and 31 may be associated with the pins 35 and 36 in such a manner that the pins come in contact with the upper or outside edges of these members, with the inner or lower edges of the members, or with slots in the members, such as those illustrated at 48 and 49, and, as explained above, the pin 39 may be fixed in direct alignment with the working edge of the director member 29 or with its center inside the margin of this director member. The perforated ends of the members 30 and 31 are constructed in such a manner that the several parts of the director mechanism can be properly interconnected, regardless of the manner in which the pins 35 and 36 make contact with the members 30 and 31, and regardless of the position of the pin 39 with respect to the director member 29. If the pins 35 and 36 make contact with the upper or outer edges of the members 30 and 31 and the pin 39 is in direct alignment with the working edge of the member 29, then the pin 39 is passed through holes or perforations in the members 30 and 31 in alignment with the upper edges of these members and with the working edge of the member 29, as illustrated in Fig. 16. If the pin 39 lies inside the margin of the member 29, then perforations are used which lie outside the upper marginal portions of the members 30 and 31, as illustrated in Fig. 15. In each case the parts are arranged so that lines representing the edges of the members 30 and 31 in contact with the pins 35 and 36 and the line representing the working edge of the member 29 all intersect at a common point. If the pins 35 and 36 engage the slots 48 and 49 in the members 30 and 31, then the pin 39 is passed through centrally located perforations in these members, such as those illustrated at 50 and 51, and if the lower edges of the members 30 and 31 come in contact with the pins, then other perforations are employed, such as those shown at 52 and 53.

In Fig. 4 I have illustrated the use of my improved director mechanism as a means for indicating the position of transverse lines in the perspective figure. This is desirable where the vanishing point is located at a considerable distance from the drawing board. In this figure I have illustrated the members 30 and 31 of the director mechanism slidably pivoted about pins 35' and 36' located on the drawing board in such a manner that the director member 29' has its working edge always in alignment with the vanishing point. Suitable positions for the pins 35' and 26' can be determined in the manner described in connection with the location of pins 35 and 36 of Fig. 1. The members 30, 31, and 29' are preferably interconnected by means of a graduated disc 34' and set screws 32' and 33', and it will be understood that the members 30 and 31 can be adjusted so that they make equal angles with the working edge of the member 29'. The pins 35' and 36' may engage the slots 48 and 49 in the members 30 and 31, or they may engage the upper or the lower edges of these members. Where they engage the edges of the members, I prefer to employ the improved guiding devices 15, the details of which are clearly illustrated in Fig. 7. These devices hold the members 30 and 31 firmly in contact with the pins 35' and 36', while permitting these members to slide freely with respect to these pins.

The apparatus shown in Fig. 4 is arranged in a position such that the member 29' serves to indicate the correct positions for lines converging at the vanishing point illustrated in this figure. It will be observed that the members 30 and 31 are so associated with the disk 34' that they can be adjusted to form acute angles with the member 29' as well as obtuse angles. Accordingly, by merely readjusting the members 30 and 31, the device can be used for indicating the correct positions for lines of the respective drawing which converge at the other vanishing point (not shown in Fig. 4). Separate pins can be fixed in the drafting board in the manner described in connection with the location of pins 35 and 36 of Fig. 1, the pins being arranged so as to cooperate properly with the members 30 and 31 in their adjusted position. This makes it possible to draw all of the lines working from one side of the drafting board; it is not necessary to transfer the apparatus to the other side of the drafting board in order to draw the lines converging at the other vanishing point.

The ruler 29 shown in Fig. 15 may be of ordinary construction and not provided with long slots such as that illustrated in Fig. 1 cooperating with the pin 40. A separate member 29ª having a slot therein, can be fastened to the graduated disc 34 and this disc in turn fastened to the member 29.

Where the directing member is used, as illustrated in Fig. 4, it is desirable to have the pin 39 adjusted so that it is in line with the working edge of the director member 29'. On the other hand, where the directing mechanism is used, as illustrated in Fig. 1, it is desirable to have this pin 39 fixed in position inside the working edge of the director member 29, as illustrated in Fig. 15, unless the members 30 and 31 are mounted on the pins 35 and 36 with the slots in these members receiving these pins.

In Fig. 3 I have illustrated an embodiment of my invention similar to that illustrated in Fig. 1, except for the construction of the director mechanism, and therefore it is deemed sufficient to describe only this modified director mechanism; the other parts bear the same reference numerals as the corresponding parts in Fig. 1, and can be understood by referring to the detailed description of Fig. 1. The director mechanism of Fig. 3 includes a member 29" which is actually pivoted about the observation point, a pin 54 being located at this point. If the observation point lies within that portion of the drawing board on which the perspective view is being made, then I prefer to have it mounted on an arm such as that illustrated at 55 secured to the drawing board near the edge thereof by any suitable means such as clamps or bolts. This arm is raised above the drawing board a distance sufficient to permit free movement of the indicator member 12 under the arm. The arm 55 is spaced apart from the surface of the drawing board by a spacer block such as that shown in dotted lines, and it will be understood that both the arm and the spacer block are clamped or otherwise secured to the board in any desired position. The director member 29" is preferably connected to the pivot pin 54 by adjustable links, such as those shown at 56, 57, and 58. These links are so arranged that they do not cover up the perspective figure so as to interfere with the drawing of this figure. It will be understood that the links 56, 57, and 58, can be rigidly clamped together and to the member 29" so that all these parts can be swung as a unit around the pivot pin 54. Movement can be imparted to this director mechanism by the indicator member 12 by means of the pin 40 carried by the member 12 and cooperating with the slot in the director member.

My improved perspective drafting appliance, certain embodiments of which have been described in detail above, includes combinations of simple, inexpensive parts constructed and arranged in such a manner that they can all be moved as desired by simply applying a force to a single part of the apparatus, such as the slide 22' which then acts as a governing center. The several parts of the apparatus can be independently or simultaneously lifted from the drafting board so as to leave the board entirely free from any obstruction and they can be as easily replaced. The parts can be constructed so as to permit a wide variation in adjustment, thus permitting the draftsman to make perspective views of any desired dimensions. Furthermore, my improved drafting appliance is of such a character that it can be used in making perspective drawings following the rules ordinarily employed in making such drawings where no such appliance is employed. It is not necessary to have working plan and elevation views especially prepared or located in any unusual positions with respect to that portion of the board on which the perspective view is to be made. The plan and elevation views can be simply arranged on the drawing board in the same plane as the contemplated perspective view.

It is to be understood that my invention is not limited to the particular embodiments thereof illustrated and described, but includes such modifications thereof as fall within the scope of the appended claims. Many of the details of construction can be modified without sacrificing all the advantages of the invention, and various parts of the apparatus are capable of use independent of other portions of the apparatus.

I claim:

1. A perspective drawing appliance, comprising the combination with a drawing board of a pin associated with said board, a ruler, means for holding the ruler with one edge thereof in contact with said pin while permitting the ruler to slide with respect to the pin, said means comprising a support and a member carried thereby adapted to engage the other edge of the ruler, the top of the first mentioned edge of the ruler being unconfined, whereby the ruler may be lifted from the board without removing the said means from the board.

2. A perspective drafting appliance, comprising the combination with a drawing board of a pin associated with said board, a ruler, and means for holding the ruler with one edge thereof in contact with said pin while permitting the ruler to slide with respect to the pin, said means comprising a supporting member having an opening therein to receive the pin, and a pair of rollers mounted on said supporting member and adapted to engage the edge of the ruler remote from the pin.

3. A perspective drafting appliance, comprising the combination with a drawing board of a pin associated with said board, a ruler, means for holding the ruler with one edge thereof in contact with said pin while permitting the ruler to slide with respect to the pin, a second pin associated with the board, a second ruler, and means for holding this second ruler with one edge thereof in contact with the said second pin while permitting this ruler to slide with respect thereto, and means slidably interconnecting the two rulers whereby movement can be imparted to one ruler by moving the other ruler.

4. A perspective drafting appliance, comprising the combination with a drawing board of a ruler, a guide for said ruler extending along one edge of said board, means connecting the ruler to the guide to permit movement of the ruler in a direction parallel to this edge of the board, a second ruler, pivot means connecting said second ruler to the board, and means for slidably interconnecting the two rulers whereby motion can be imparted to one ruler by moving the other, said pivot means engaging a ruling edge of the second ruler.

5. A perspective drafting appliance, comprising the combination with a drawing board of a ruler, a guide for said ruler extending along one edge of said board, means connecting the ruler to the guide to permit movement of the ruler in a direction parallel to this edge of the board while preventing movement of the ruler away from the board in the plane thereof, a second ruler, pivot means connecting said second ruler to the board, and means for slidably interconnecting the two rulers whereby motion can be imparted to one ruler by moving the other, said interconnecting means comprising a member slidably associated with one ruler, a second member slidably associated with the other ruler, and means interconnecting these two members.

6. A perspective drafting appliance, comprising the combination with a drawing board of a ruler slidably mounted substantially at one edge of the board, a second ruler slidably mounted substantially at an edge of the board angularly related to the first-mentioned edge, a third ruler pivoted to the drawing board, and means slidably interconnecting the three rulers whereby motion can be imparted to any two of them by moving the remaining ruler.

7. A perspective drafting appliance, comprising the combination with a drawing board for supporting a plan view and a perspective view in the same plane, of a ruler movable over the perspective view, directing means movable over the plan view, means for guiding the directing means, and means interconnecting the ruler and the directing means whereby movement can be imparted to one of these devices by moving the other, all of said parts being arranged above the surface of the drawing board.

8. A perspective drafting appliance, comprising the combination with a continuous drawing board for supporting a plan view and a perspective view in the same plane, of a ruler movable over the perspective view, directing means movable over the plan view, means interconnecting the ruler and the directing means whereby movement can be imparted to one of these devices by moving the other, and means for controlling the movement of the directing means so that a portion thereof always remains in line with an observation point, all of said parts being arranged above the surface of the drawing board.

9. A perspective drafting appliance, comprising the combination with a drawing board for supporting a plan view and a perspective view in the same plane, of a ruler movable over the perspective view, directing means movable over the plan view, means interconnecting the ruler and the directing means whereby movement can be imparted to one of these devices by moving the other, and means for controlling the movement of the directing means so that a portion thereof always remains in line with an observation point, the said controlling means comprising a pair of pins fixed with respect to the board at points equidistant from the observation point and equidistant from the vertical center line passing through the observation point, and members slidably pivoted on said pins and connected to said directing means.

10. A perspective drafting appliance, comprising the combination with a drawing board of a directing device comprising three interconnected angularly adjustable members, a pair of pins associated with the board, means for holding one of said members with one edge thereof in slidable engagement with one of said pins, means for holding a second member with one edge thereof in slidable engagement with the other pin, a disk arranged to engage the three members, and means for fixing each of the members to the disk in an adjusted position.

11. In a perspective drafting appliance the combination of a drawing board, a member having a slot therein and a pin associated with said drawing board and adapted to project into said slot, said pin having an angular portion adapted to engage one edge of the slot and providing an edge forming a pivot for said member, and a curved portion adapted to engage the other edge of the slot, the center of curvature for this portion coinciding with the edge of the angular portion.

12. In a perspective drafting appliance the combination of a ruler having a cutaway portion, a member adapted to be carried by said ruler, a pivot pin carried by said member, means for rigidly securing said member to the ruler with the pin in an adjusted position near said cutaway portion and a pair of links pivoted about said pin and freely movable with respect to said member.

13. In a perspective drafting appliance the combination of a ruler member, two superimposed link members and a pin pivotally interconnecting the said link members with the ruler member, said link members being constructed so that they can be connected to the ruler member with one edge of the ruler member in alignment with said pin, and so that the link members can be brought into positions forming acute angles with the ruler member.

14. In a perspective drafting appliance the combination of a ruler member, a link member and a pin pivotally interconnecting the said members, said link member being constructed so that it can be connected to the ruler member with one edge of the ruler member in alignment with said pin and so that the link member can be connected to the ruler member with this edge of the ruler member out of alignment with said pin.

15. A perspective drafting appliance, comprising the combination with a drawing board of a ruler, a guide for said ruler extending along one edge of said board, means connecting the ruler to the guide to permit movement of the ruler in a direction parallel to this edge of the board while preventing movement of the ruler away from the board in the plane thereof, a second ruler, pivot means engaging said second ruler, means for slidably connecting the two rulers whereby motion can be imparted to one ruler by moving the other and means for supporting said pivot means above the surface of the drawing board to permit free movement of the first mentioned ruler.

16. In a perspective drafting appliance, the combination of a device comprising three members angularly adjustable with respect to each other, a graduated disk associated with the three members and having arcuate slots therein, and means cooperating with the arcuate slots for fixing each of the three members to the disk in any desired position relative to the other two members, the several parts being constructed and arranged in such a manner that two of the members can be adjusted to form obtuse angles with the third member, and so that they can also be adjusted to form acute angles with the third member.

In testimony whereof I affix my signature.

THEODORE A. DE POSTELS.